Aug. 14, 1934.   J. B. BARNETT   1,970,215
CARD, PICTURE, AND SIGN EXIBITING
Filed Sept. 20, 1933   3 Sheets-Sheet 1

Inventor
John B. Barnett
By H.S. Woodward
Attorney

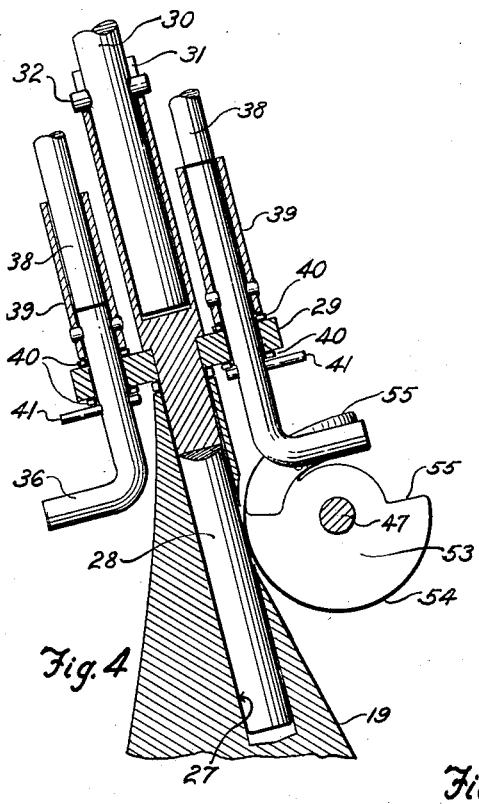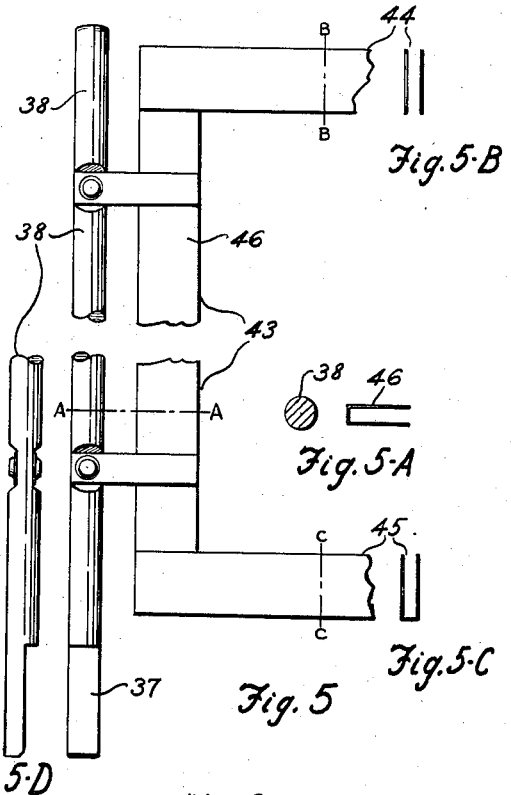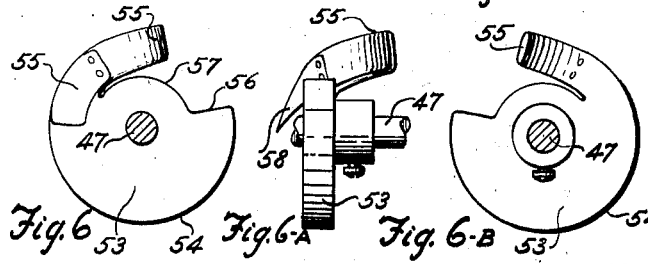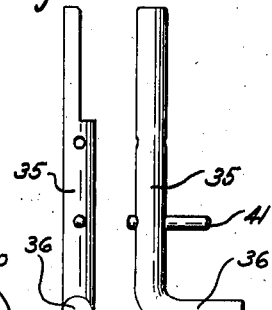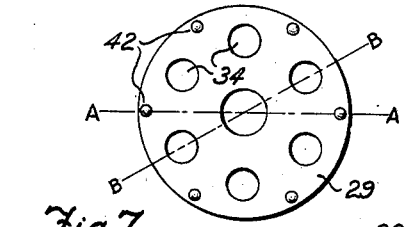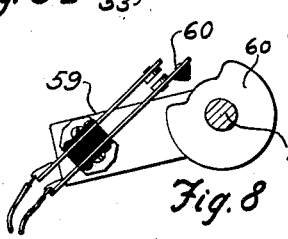

Aug. 14, 1934.   J. B. BARNETT   1,970,215
CARD, PICTURE, AND SIGN EXIBITING
Filed Sept. 20, 1933   3 Sheets-Sheet 3

Inventor
John B. Barnett
BY H S Woodward
ATTORNEY

Patented Aug. 14, 1934

1,970,215

UNITED STATES PATENT OFFICE 1,970,215

CARD, PICTURE, AND SIGN EXHIBITING

John B. Barnett, Washington, D. C.

Application September 20, 1933, Serial No. 690,281

11 Claims. (Cl. 40—104)

The invention has for an object to effect improvements in advertising devices of the general character in which a series of leaves are turned. It has for an object to simplify the construction of such apparatus, to the end that manufacturing costs may be reduced, and the device constructed with few and rugged parts liable in a minium degree to derangement. It is also an important aim to enable the embodiment of the necessary apparatus by utilizing stock materials and apparatus and in its special features conforming to production methods of a simple nature.

It is one salient object to enable the construction of a leaf carrier of a highly satisfactory character utilizing the simplest materials fabricated in an inexpensive manner, and to operate these by a single operating member of extremely simple form.

It is contemplated to enable the setting up of an advertising device in which the entire display assembly may be removed manually by mere lifting thereof, and replaced by another which by mere manual emplacement will be in proper operative relation to the operating mechanism without requiring delicacy of adjustment or mechanical skill. In this way numerous devices may be placed in operation at scattered locations, the subject matter prepared at a central office where the display units consisting of only the card or leaf holding group or assembly will be made up with desired changes of program, and these prepared units sent to the proper machines by a messenger, who will lift off the old display with one hand and set in place the new set with the other hand. The advantage of this will be well understood for department store service, and for city network advertising systems of various businesses.

Additional objects, advantages and features of invention reside in the construction, arrangement and combination of parts involved in the embodiment of the invention as will appear from the following description and accompanying drawings, in which Figure 1 is a perspective view of one possible embodiment of the invention, parts of the casing being broken away.

Figure 4 is an enlarged vertical section of the turn-table structure and mounting.

Figure 5 is a detail of one of the leaf holders detached.

Figure 5—A is a section on the line A—A of Figure 5.

Figure 5—B is a section on the line B—B of Figure 5.

Figure 5—C is a section on the line C—C of Figure 5; Fig. 5—D is a fragmentary elevation of the shaft 38 from the left of Fig. 5.

Figure 6 is a left hand elevation of the cam.

Figure 6—A is a front view thereof.

Figure 6—B is a right hand elevation of the cam.

Figure 7 is a bottom view of the turn-table plate.

Figure 7—A is a section thereof on the line A—A of Figure 7.

Figure 7—B is a section on the line B—B of Figure 7.

Figure 8 is a fragmentary detail of the circuit closer for the lamp.

Figure 9 is a detail of the turner for a leaf holder.

Fig. 9—A is a similar view from the left of Figure 9.

Figures 10, 11:
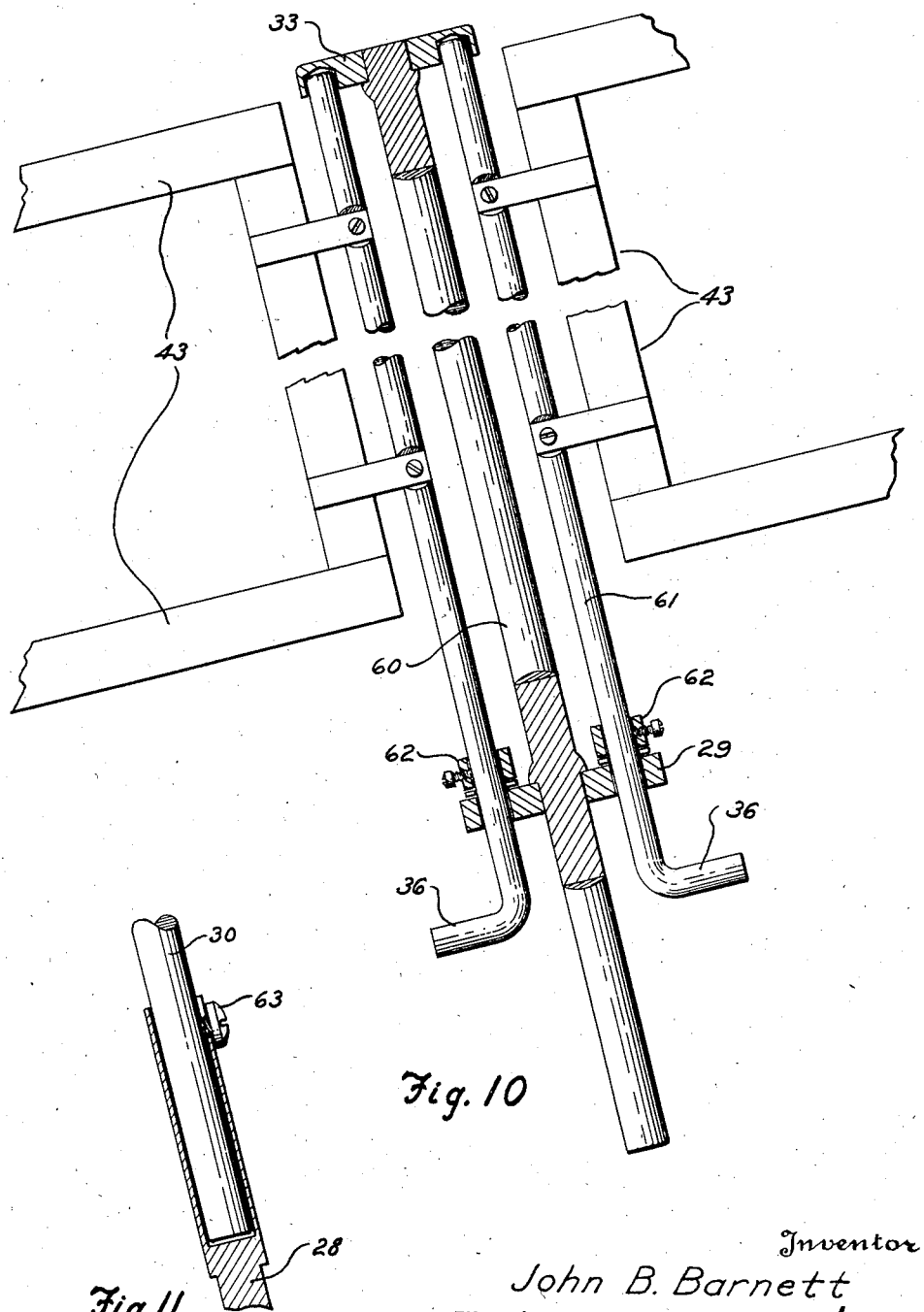

Figure 10 is an elevation of a modified turret.

Figure 11 is a detail of a modification of the mounting of the shaft 30.

There is illustrated an advertising unit including a case 15 having a base plate 16 on which there is bolted the foot flanges of a motor 17, and the foot plate 18 of the turn-table mounting 19. The case includes a slightly inclined front wall 20, slightly higher than the back wall 21, and a top 22, which may be removable or not as desired, and may be in one or more pieces as required. In the present instance it stops short of the front wall 20 a distance, forming a slot 23 at the extreme front part of the case across the top, and from the front wall 20 a light guard 24 is extended rearwardly and upwardly over the slot 23 as an integral continuation of the front wall and forming a front top of the case. One or more electric lamps 25 are mounted just within this slot to illuminate the displayed matter while at observation position. The end walls 26 are shaped suitably to form junctions with the wall 20, 21, 22 and 24.

The mounting 19 is shown as a casting on which a step bearing 27 is formed consisting of a simple cylindrical bore on an axis at a slight angle to the vertical, ten degrees inclination having been found satisfactory, although this may be varied as circumstances may require. The bored part is suitably braced by webs from the plate 18.

Set removably in the bearing 27 there is a stud shaft or pintle 28 on which there is fixed a disc 29, above which the shaft 30 is continued either integrally or by a separable telescopically connected shaft 29 to the top of the leaf holder assembly to be described.

For this purpose the shaft 28 is bored axially at its upper end and formed with longitudinal slots 31 at the extremity, the end of the shaft 30 being slidably inserted in this last named bore and fixed against relative rotation by a pin 32, the ends of which engage in the slots so that the shaft 30 may be lifted out when desired. The shaft 28 may be held in its bearing by any usual retainer, if desired. If the shaft 28 is extended integrally it will be removable from the step bearing manually as will be explained. The shaft 30 has fixed at its upper extremity a disc 33 of the same diameter as the one 29, and the two discs have each a concentric series of apertures 34 therein, the openings in one disc being alined with those of the other disc.

In the lower disc leaf turner shafts 35 are revolubly engaged in the openings 34, projecting rectilinearly a short distance below the disc and having their lower ends bent at right angles and extended a short distance forming arms 36 (which may be termed eccentrics). The upper ends of the shafts 35 may be extended integrally to the disc 33 if the shaft 28 is so extended, but as shown project only a short distance above the disc 29, being flattened on one side at 37 to form half of a scarf separable joint with an upper leaf holder shaft 38, a sleeve 39 being pinned to each shaft 35 around the joint and resting on a washer 40 at the top of the disc 29 as a support for the leaf holders, as will be described. A pin 41 is engaged through each shaft 35 below the disc, projecting in line with the arm 36 and serving as a stop for pivotal movement of the holders by engagement with strike pins 42 fixed in the lower face of the disc 29 in proper positions for the purpose. The pins 41 retain the shafts 35 in the disc, washers 40 being confined thereby against the disc. The shafts 38 are engaged revolubly in the upper disc 33.

On each of the shafts 38 leaf holder frames 43 are mounted, which may be constructed in any suitable manner to hold cards, signs, plates or sheets of various kinds on which there may be displayed written or printed matter, pictures, signs, goods, or articles, as desired. They are preferably so constructed that the displayed matter may be readily removed and replaced by other material. For this purpose, each frame has a top member 44 slotted through from top to bottom, a bottom member 45 U-shaped in section, and side members 46 of similar U-form connecting the two other members of the frame, so that sheets and other material may be inserted slidably from the top and removed similarly. Other constructions of frames may be employed as required, the particular construction thereof being familiar.

It will be apparent that the shafts 38 may be integral continuations of the shafts 35, and the shafts 28 and 30 integral, in which event the top disc 33 (being secured to the shaft 38) may be grasped and the entire assembly of leaf holders and shaft 28 thereby lifted out as a unit and replaced by another as required, by simple insertion of the shaft 28 in the step bearing.

Figure 1:
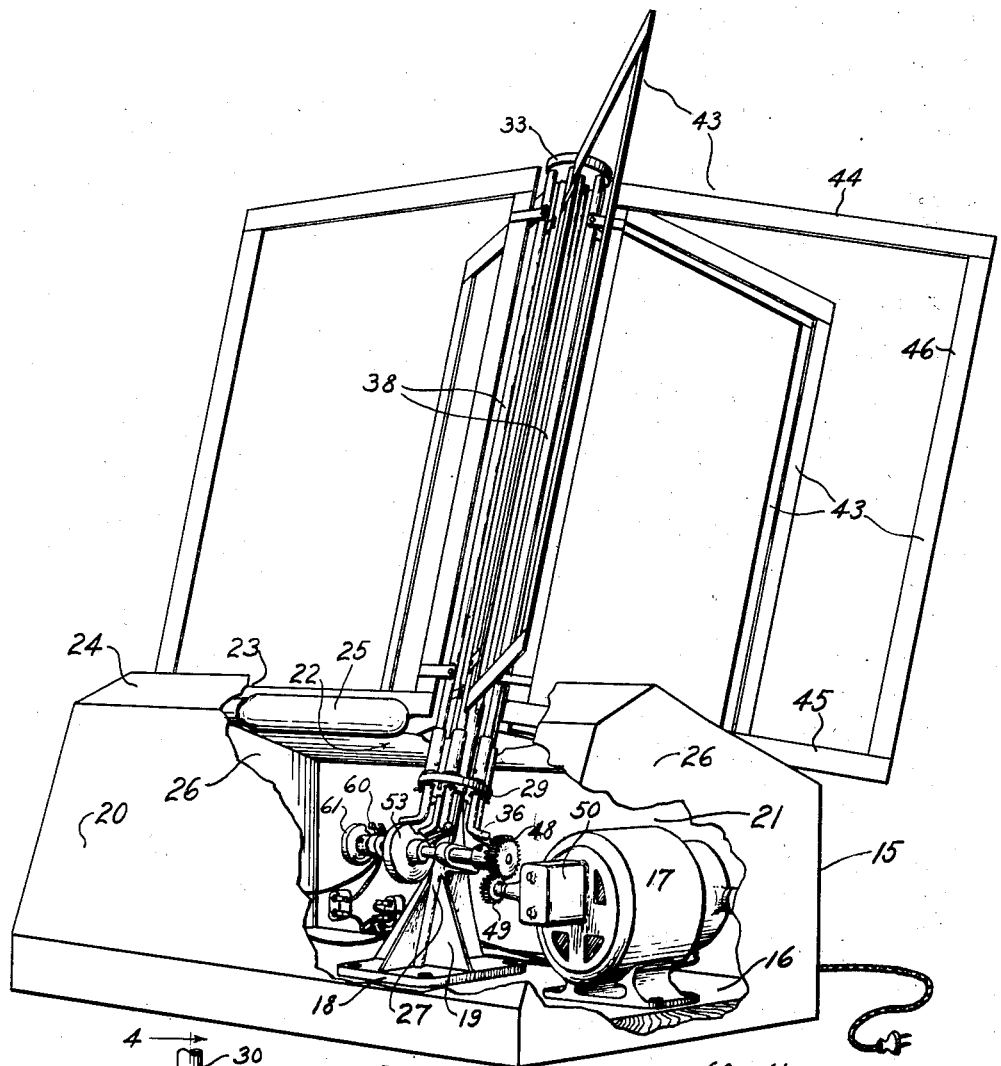
Figure 2:
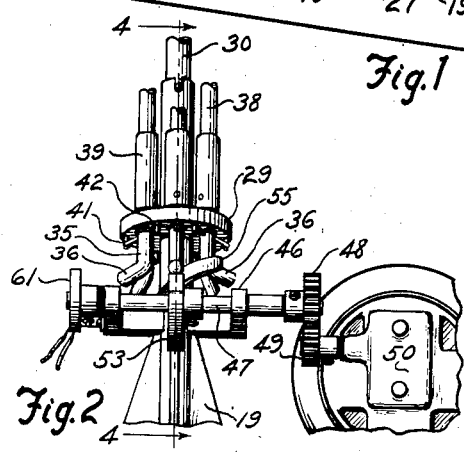
Figure 2 is a front detail view of the cam and leaf holder assembly base or turn-table.
Figure 3:
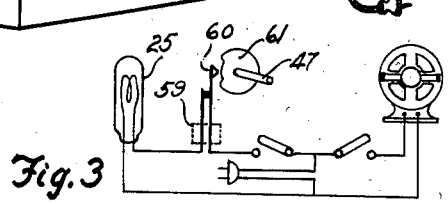
Figure 3 is a diagram of the wiring circuit of the particular apparatus illustrated.

The mounting 19 includes bracket bearings 46 at the front side, in which there is revoluble a horizontal shaft 47 projecting at each side, and having a driven pinion 48 thereon next the motor meshed with a small driving pinion 49 forming the terminal member of any suitable reduction train 50 mounted on the motor frame. At the opposite end outwardly of the mounting 19 a cam 61 is fixed on the shaft 47 and arranged to operate the circuit maker and breaker 59 which may be of any familiar or special construction, connected as shown in the diagram of the circuits (Fig. 3) to actuate the lamp 25.

Centrally of the mounting 19 there is fixed on the shaft 47 a main operating cam or pushing member 53 for the leaf holders. This cam consists of a planiform lobe or sector 54, its periphery concentric with the shaft 47, a lateral projection of its radius including the lower end portions and arms 36 of the two shafts 35 at the front medial part of the disc 29 which is the display or observation point or position. This sector portion is preferably of a thickness to lie between the lower projections of the shafts 35 with a slight clearance to avoid undue friction so that the assembly of shafts 35 and 38 can not be turned in either direction when the sector is at its upper position. The shafts 35—38 and arms 36 immediately to the right of the cam before engagement by the arm 55 may be said to be in initial operative position, while those at the opposite side after swinging of the respective leaf holder may be said to be in terminal operative position. The sector extends over slightly more than 180 degrees radius, as shown, although this is not arbitrary, and the cam is formed with an integral helicoidal pusher arm or vane 55 which projects on one side of the cam only and in the direction of rotation of the cam to a point close to or beyond the opposed or terminal edge 56 of the sector 54. The low part 57 of the cam is low enough to permit the arms 36 and the lower ends of the shafts 35 to move over and transversely across the cam from one side to the other.

The cam is provided with a leaf spring 58 at the side opposite the vane 55, which projects opposite the direction of rotation of the cam and laterally from the plane of the sector 54 a distance, but this may be omitted if desired. The spring is so located and shaped that, as the vane 55 moves one of the shafts across the plane of the cam, if the arm 36 does not swing to the left, the spring will press thereagainst and move it pivotally on the shaft 35 as an axis, all the shafts 35 and the disc 29 being held against rotation as a unit on the shaft 28 by reason of the interposition of the sector 54 between the two most forwardly shafts 35. By reason of the inclination of the axis of the assembly of shafts 35 toward the rear, as soon as one of the arms 36 is moved from right to left beside the sector, the momentum of the leaf holder, the momentum of air following it, and the action of gravity will cause it to complete its movement to full open position at the left with the pin 41 resting against the adjacent stop 42, even if the spring 58 be omitted.

The motor, cam and operative connections comprise a pushing mechanism to push the arms 35 and shafts 38 from initial operative position toward terminal operative position.

The circuit to the lamp is controlled by a circuit closer 59 including an operating wiper 60 operated by a cam 61 on the left end of the shaft 47. It will be noted that the high part of this cam causes closing of the circuit while the leaf holders are stationary in observation position, and the low part of the cam causes opening of the circuit during the times the leaves are being turned.

In use, the appliance being assembled as described, and the motor being energized, the cam will be rotated to move its top side forwardly at intervals suited to the nature of the matter displayed. This interval may be varied by substituting a larger or smaller gear 48 and shifting the motor to bring the gear 49 into mesh therewith properly.

As the helicoid arm 55 moves forwardly, its extremity strikes the outer part of the arm 36 on the right hand one of the two most forwardly shafts 35, pushing it forwardly, and causing the leaf holder 43 on the respective shaft 38 to swing from its extreme right hand observation position forwardly on the shaft 38 as a pivot. When the arm 36 has turned sufficiently to lie parallel with the adjacent portion of the helicoid 55, the helicoid engages the base portion of the arm and moves the shaft 35 and turret clockwise, as viewed from above. The turning of the shaft 35 and shaft 38 on their axes also continues by the pressure of the cam against the right hand side of the arm 36, and after the arm 36 reaches a position at the left of and parallel to the cam sector 54 the rotation of shafts 35—38 is continued by friction of the cam against the right hand side of the shaft 35, as well as by the momentum already imparted to the leaf holder and by impact of air against the content of the leaf holder which air has been drawn behind the leaf holder by the initial movement of the content of the holder. Principally, the movement is completed by the action of gravity, due to the rearward inclination of the leaf holder assembly.

If the shafts 35—38 should stick with the leaf holder only partly turned after rotation of the assembly one stage, the spring 58 will press the arm 36 to the left still further causing completion of the movement of the leaf holder.

By forming the shafts 35—38 in one piece, the sleeves 39 may be omitted, and by forming the shafts 28 and 30 in one piece, with the disc 29 secured to the central shaft as already shown, the entire leaf holder assembly (which may be called a turret or turntable) may be grasped manually at the top disc 33 and lifted from the mounting 19 whether the motor is operating or not, and may again be put in place or replaced by another by a reverse operation, even with the motor operating.

In this way, as before explained, when it is desired to change the program or collection of matter on a machine, a separate turret including the shaft 30, and assembly of shafts 38 and leaf holders thereon may be prepared at a distant point with the desired change of display, and sent by messenger to be substituted as indicated. A route for the messenger may include a multiplicity of widely distributed machines, and the messenger may carry a large collection of turrets to be substituted for those on machines on his route. Advertising agencies and specialists may thus exercise a closer supervision and prompt changes of display.

In Figure 10, a specific embodiment of the turret in which the central shaft parts correspond to the shafts 28—30 are formed as one shaft 60, and instead of the separate elements 35 and 38 forming the pivots of the leaf holders, a single shaft 61 is formed of simple rod stock, having its lower end bent to form the arm 36, in each instance. The lower disc 29 and other construction may be the same as before described. The turret of Figure 10 is interchangeable with that shown in the preceding figures, and the shaft 28 and disc 29.

The shafts 61 may be supported on the disc 24 by collars 62 having set screws therethrough engaging the respective shafts or by any other approved means.

In Figure 11 the pin 32 of Figure 4 has been replaced by a set screw 63 so that the shafts 30 and 28 may be secured together. The shafts 28 may thus be lifted out as part of the turret unit, carrying also the disc 29 and shafts 35 with it.

I claim:—

1. In an advertising device of the character described a cam mounted revolubly and comprising a planiform disc-like element, at right angles to the axis of rotation in the form of a sector of a circle, a laterally inclined extension from one edge thereof, means to rotate the cam on said axis in the general direction of the projection of said helicoidal extension, a socket bearing adjacent the cam, a shaft revolubly stepped therein on an axis parallel to the sector, a plurality of leaf holders pivotally mounted on the shaft on axes parallel thereto in a concentric series, said holders having terminal arms adjacent the cam projected laterally from the respective holder axes and lying in the radius of the cam with two mutually adjacent arms lying at respective sides of the cam, said arms having an initial position projecting laterally with respect to the plane of the cam in the path of said extension of the cam; whereby on rotation of the cam the disc portion will move between two arms and hold the leaf holder assembly against rotation, and the extremity of said projection of the cam will engage the adjacent arm, turn the same on the axis of the leaf holder, engage the base of the arm and rotate the leaf holder assembly as a unit when the open part of the disc is adjacent the arm, whereby the arm may pass the plane of the disc.

2. The structure of claim 1 in which the axis of the socket bearing and shaft are inclined backwardly from the cam.

3. A revoluble support, a plurality of upstanding leaf holders pivoted theron on axes parallel to the axis of rotation of the support, and having lower terminal ends provided with lateral arms, said leaf holders and arms being constructed to lie divergently at an observation position for the purposes described, a cam mounted revolubly below the leaf holders medially of the observation position and having a helicoidal vane segment lying within a circle concentric with the cam and including the arm initially adjacent the observation position, each arm being constructed to project across the path of the advanced portion of the vane.

4. The structure of claim 3 in which the axis of rotation of said revoluble support is inclined from the cam in a plane medially of said observation position, whereby gravity will hold the leaf holders yieldingly in initial operative position, and will move them to terminal operative position when past dead center.

5. In a device of the character described, a revolubly mounted turn-table, a multiplicity of leaf holders pivoted thereon on axes arranged in a series concentric with the axis of the turn-table and uniformly spaced, each including an axial downward projection having a lateral arm, a revoluble cam therebelow having a concentric planiform sector portion arranged to engage between mutually adjacent axial downward projections, and having a continuation of helicoidal form projected in the direction of rotation and spaced from the opposed part of the sector, the extremity of said extension being positioned to engage the adjacent lateral arm in its path.

6. The structure of claim 5 in which the turntable mounting comprises a socket bearing and a stud shaft stepped therein withdrawably.

7. The structure of claim 5 in which the turntable mounting comprises a socket bearing and a stud shaft stepped therein withdrawably, the axis of said bearing and shaft being inclined away from the axis of the cam at an acute angle to the vertical.

8. A revoluble support, a plurality of upstanding leaf holders pivoted thereon on axes parallel to the axis of rotation of the support and having lower terminal ends provided with lateral arms, said leaf holders and arms being constructed to lie divergently at an observation position for the purposes described, a pushing mechanism therebelow including a movable pushing member movable in a path including the arm at initial observation position and coinciding with the path of that arm to terminal observation position.

9. The structure of claim 8 in which the axis of the support and the axes of the leaf holders are inclined at an acute angle to the perpendicular in a vertical plane midway of the leaf holders at said observation position.

10. In an exhibiting device of the character described, a support having a step bearing thereon, a display assembly comprising an upstanding stud shaft stepped revolubly and withdrawably in the bearing, a plurality of leaf holders mounted for independent pivotal movement on respective axes uniformly spaced concentrically about the shaft, each holder having an axial portion and an eccentric exposed below said assembly and having an initial operative position and a terminal operative position, and a pushing mechanism below the eccentrics mounted independently of said assembly, and including a movable pushing means movable in a path including the axial portion and eccentric of the leaf holder at initial operative position said path including also the path of the eccentric and the path of the axial portion of the leaf holder for a predetermined distance, and means to stop movement of the leaf holders and assembly after each operation of the pushing means, and means to operate said pushing means.

11. The structure of claim 10 in which the axis of said bearing and stud shaft is inclined at an acute angle to the vertical and in a vertical plane midway of the leaf holders at the initial and terminal operative positions.

JOHN B. BARNETT.